(12) United States Patent
Otsuka et al.

(10) Patent No.: US 10,372,394 B2
(45) Date of Patent: Aug. 6, 2019

(54) INFORMATION PROCESSING APPARATUS AND NON-TRANSITORY RECORDING MEDIUM

(71) Applicant: Konica Minolta, Inc., Tokyo (JP)

(72) Inventors: Takashi Otsuka, Kobe (JP); Kazuma Maruyama, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/592,449

(22) Filed: May 11, 2017

(65) Prior Publication Data

US 2017/0329563 A1 Nov. 16, 2017

(30) Foreign Application Priority Data

May 11, 2016 (JP) .................................. 2016-095140

(51) Int. Cl.
*G06F 3/12* (2006.01)
(52) U.S. Cl.
CPC .......... *G06F 3/1258* (2013.01); *G06F 3/1204* (2013.01); *G06F 3/1205* (2013.01); *G06F 3/1257* (2013.01)
(58) Field of Classification Search
CPC combination set(s) only.
See application file for complete search history.

(56) References Cited

U.S. PATENT DOCUMENTS

| | | | |
|---|---|---|---|
| 2010/0085599 A1* | 4/2010 | Nomura | G06F 3/1204 358/1.15 |
| 2011/0199640 A1* | 8/2011 | Shirai | G06F 3/1204 358/1.15 |
| 2015/0138579 A1* | 5/2015 | Miyazaki | H04N 1/00007 358/1.13 |
| 2016/0360061 A1* | 12/2016 | Akiyama | H04N 1/32112 |
| 2017/0111533 A1* | 4/2017 | Sako | H04N 1/00832 |
| 2017/0173889 A1* | 6/2017 | Thomas-Lepore | G06F 21/31 |
| 2017/0322754 A1* | 11/2017 | Saito | G06F 3/1225 |

FOREIGN PATENT DOCUMENTS

JP 2006-285476 10/2016

* cited by examiner

*Primary Examiner* — Helen Zong
(74) *Attorney, Agent, or Firm* — Baker Hostetler

(57) ABSTRACT

An information processing apparatus comprises a storage. The information processing apparatus starts an installer to install a printer driver on the storage. The installer comprises: a registration screen controller that displays a print setting registration screen about a print setting settable at the printer driver; an installation default generating part that generates an installation default print setting about at least one print setting item based on operation for print setting registration on the print setting registration screen by a user; and an output part that outputs the installation default print setting to the printer driver at the time of installation of the printer driver. The printer driver comprises a print setting managing part that stores the installation default print setting output from the installer into a first storage region in the storage, and manages the stored installation default print setting, the first storage region being a region not rewritable.

20 Claims, 15 Drawing Sheets

FIG. 14

APPLICATION INFORMATION 93

| APPLICATION | DEFAULT SETTING |
|---|---|
| APPLICATION A | INSTALLATION DEFAULT |
| APPLICATION B | DEFAULT IN USER REGION |
| APPLICATION C | DEFAULT IN COMMON REGION |
| APPLICATION D | INSTALLATION DEFAULT |

93a — APPLICATION column
93b — DEFAULT SETTING column

INFORMATION PROCESSING APPARATUS AND NON-TRANSITORY RECORDING MEDIUM

The present U.S. patent application claims priority under the Paris Convention and 35 U.S.C. § 119 to Japanese Patent Application No. 2016-095140 filed on May 11, 2016, the entirety of which is incorporated herein by reference.

BACKGROUND OF THE INVENTION

Field of the Invention

The present invention relates an information processing apparatus and a non-transitory recording medium.

Description of the Background Art

An information processing apparatus such as a personal computer (PC) becomes capable of outputting a print job to a printing apparatus connected on a network, etc., by installing a printer driver on the information processing apparatus. The printer driver is capable of making a print setting corresponding to a print function of the printing apparatus. For example, if the printer driver is started in the information processing apparatus, a print setting screen containing a plurality of print setting items is displayed on a display part of the information processing apparatus. Thus, a user is allowed to reflect an intended print setting in the printer driver by inputting an intended set value about each of the print setting items in the print setting screen.

The printer driver is installed on the information processing apparatus together with a factory default print setting containing a default value set in advance about each of the print setting items at a factory before shipment. The factory default print setting is used as an initial value of a print setting for the printer driver. Meanwhile, a user is allowed to change a setting so as to use an intended print setting as an initial value instead of the factory default print setting by performing setting operation in the above-described print setting screen.

According to a technique conventionally suggested, a first default value and a second default value are stored in a printer driver such as the one described above (this technique is disclosed in Japanese Patent Application Laid-Open No. 2006-285476 for example). If a user gives an instruction to read the first default value, the printer driver according to this conventional technique reads the first default value and reflects the read first default value in a print setting. If the user gives an instruction to read the second default value, the printer driver reads the second default value and reflects the read second default value in a print setting.

The above-described conventional technique encounters a problem in that, if the user rewrites both the first default value and the second default value, these default values cannot be restored to their original default values. For example, when the printer driver installed on an information processing apparatus is started for the first time, the user makes a print setting to be used frequently by the user himself or herself while examining each print setting item in detail. Then, the user registers the resultant print setting as an initial value to take the place of a factory default print setting. If the user thereafter erroneously rewrites the intended print setting, having been registered as the initial value, as a different print setting, the original print setting cannot be restored by simple operation such as one-click operation. Hence, like in the case of initial start, the user is necessitated to restore the original print setting by examining each print setting item in detail.

According to a different existing printer driver, even if a user accidentally rewrites an intended print setting as a different print setting, a factory default print setting can be restored by simple operation such as one-click operation. In many cases, however, the user does not know the details of the factory default print setting. Hence, great importance cannot be found in restoring the factory default print setting.

SUMMARY OF THE INVENTION

The present invention has been made to solve the above-described problems. The present invention is intended to provide an information processing apparatus and a non-transitory recording medium capable of restoring an intended print setting input for the first time by a user through simple operation.

First, the present invention is directed to an information processing apparatus that comprises a storage and starts an installer to install a printer driver on the storage.

To achieve at least one of the abovementioned objects, according to one aspect of the present invention, the information processing apparatus starts the installer which comprises: a registration screen controller that displays a print setting registration screen about a print setting settable at the printer driver; an installation default generating part that generates an installation default print setting about at least one print setting item based on operation for print setting registration on the print setting registration screen by a user; and an output part that outputs the installation default print setting to the printer driver at the time of installation of the printer driver. Further, the printer driver comprises a print setting managing part that stores the installation default print setting output from the installer into a first storage region in the storage, and manages the stored installation default print setting, the first storage region being a region not rewritable for the user.

Second, the present invention is directed to a non-transitory recording medium in which a computer-readable printer driver to be executed by an information processing apparatus comprising a storage is recorded.

To achieve at least one of the abovementioned objects, according to one aspect of the present invention, the printer driver causes the information processing apparatus to execute a first step of storing an installation default print setting about at least one print setting item output from an installer during installation of the printer driver into a first storage region, the first storage region being a region in the storage and not rewritable for a user.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 14 shows an example of application information; and

DESCRIPTION OF THE PREFERRED EMBODIMENTS

Preferred embodiments of the present invention will be described in detail below. Components common between the preferred embodiments will be identified by the same reference numbers and will not be discussed repeatedly for the same description.

First Preferred Embodiment

Figure 1:
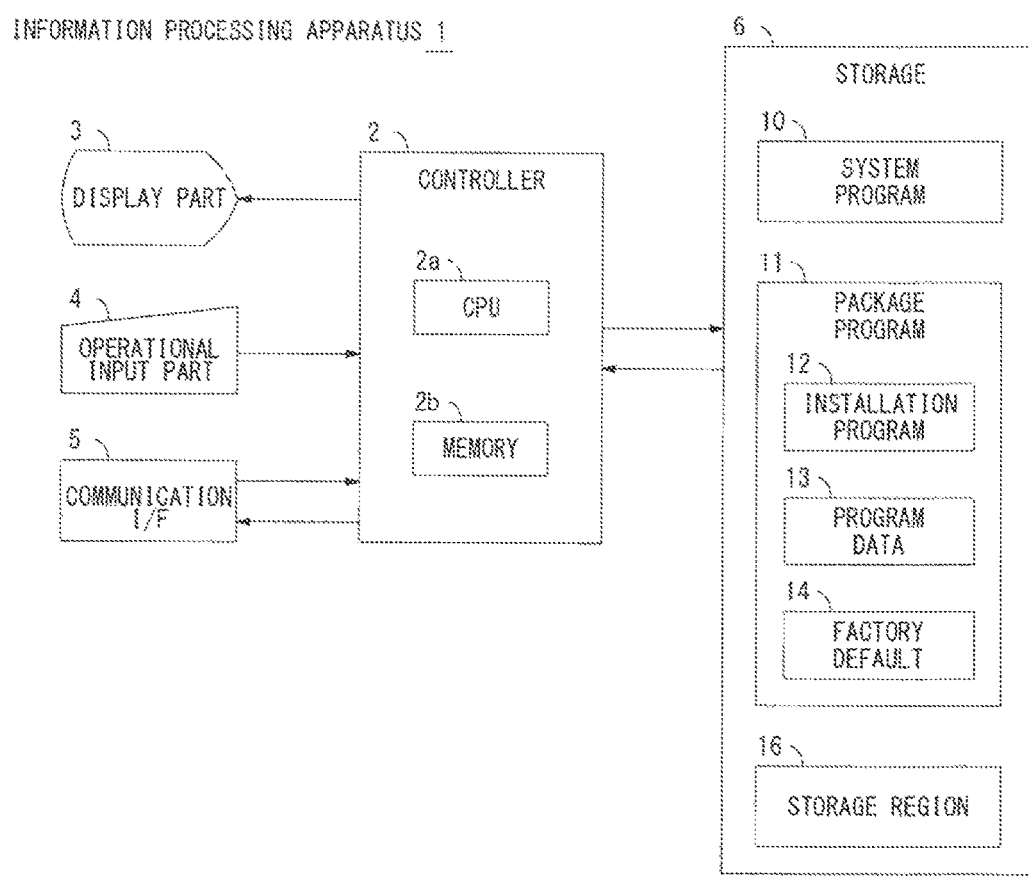
FIG. 1 shows an example of the hardware configuration of an information processing apparatus.

FIG. 1 shows an example of the hardware configuration of an information processing apparatus 1 according to one preferred embodiment of the present invention. The information processing apparatus 1 is formed of a personal computer or a tablet terminal, for example. The information processing apparatus 1 includes a controller 2 with a CPU 2a and a memory 2b, a display part 3 formed of a color liquid crystal display, for example, an operational input part 4 formed of a keyboard, a mouse, or a touch panel, for example, a communication interface 5 for connection to a network such as a local area network (LAN), and a nonvolatile storage 6 formed of a hard disk drive (HDD) or a solid-state drive (SSD), for example. The information processing apparatus 1 is connected, for example through the communication interface 5, to a printing apparatus formed of a multifunction peripheral (MFP) or a printer, for example. The information processing apparatus 1 becomes capable of generating a print job executable by the printing apparatus and outputting the generated print job by installing a printer driver corresponding to the printing apparatus on the information processing apparatus 1.

The storage 6 stores a system program 10 functional as an operating system of the information processing apparatus 1, and a package program 11 for installation of a driver program 21 for a printer driver 40 described later. The package program 11 contains an installation program 12 for installation of the printer driver 40 on the information processing apparatus 1, program data 13 about the printer driver 40, and a factory default print setting 14 containing a default value set in advance about each of a plurality of print setting items settable at the printer driver 40. The package program 11 may be downloaded through the communication interface 5, for example. Alternatively, the package program 11 may be acquired from a computer-readable recording medium such as a CD-ROM or a USB memory not shown in the drawings, for example. The storage 6 includes a region in which the system program 10 and the package program 11 are stored. The storage 6 additionally includes a storage region 16 as a free region in which the installed printer driver 40 can be stored.

The CPU 2a of the controller 2 is to read a program from the storage 6 and execute the read program. The memory 2b is to store temporary data, for example, generated by execution of the program by the CPU 2a. If the information processing apparatus 1 is powered on, the CPU 2a reads the system program 10 from the storage 6 and executes the read system program 10. For installation of the printer driver 40 on the information processing apparatus 1 based on operation for instructing the installation by a user, the CPU 2a of the controller 2 reads the installation program 12 in the package program 11 from the storage 6 and executes he read installation program 12. By doing so, the driver program 21 for the printer driver 40 is installed on the storage region 16 as a free region in the storage 6.

During installation of the printer driver 40, the information processing apparatus 1 accepts operation for inputting a print setting by a user and registers the input print setting as a default setting for the printer driver 40. At this time, the information processing apparatus 1 stores the print setting designated by the user into a storage region not rewritable for the user, and manages the stored print setting. The information processing apparatus 1 functioning in this way will be described in detail below.

Figure 2:
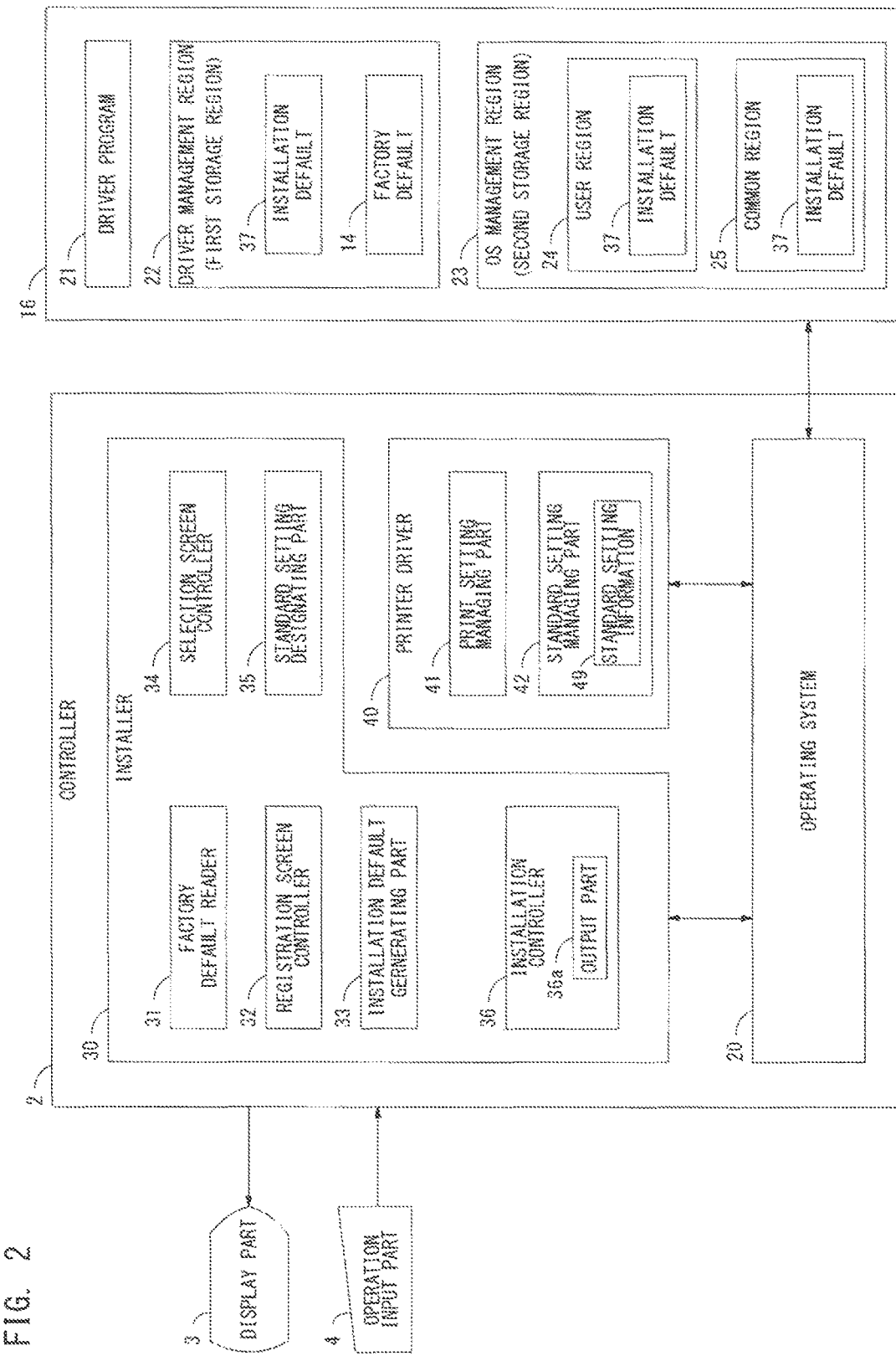
FIG. 2 is a block diagram showing an example of the functional configuration of a controller formed at the time of installation of a printer driver.

FIG. 2 is a block diagram showing an example of the functional configuration of the controller 2 formed at the time of installation of the printer driver 40. In response to execution of the system program 10 by the CPU 2a, the controller 2 starts an operating system 20. If a user instructs installation of the printer driver 40 while the operating system 20 runs in the controller 2, the controller 2 executes the installation program 12 to start an installer 30.

As shown in FIG. 2, the installer 30 includes a factory default reader 31, a registration screen controller 32, an installation default generating part 33, a selection screen controller 34, a standard setting designating part 35, and an installation controller 36.

The factory default reader 31 comes into operation in response to start of the installer 30. The factory default reader 31 reads the factory default print setting 14 in the package program 11 from the storage 6. If the factory default reader 31 reads the factory default print setting 14, the installer 30 puts the registration screen controller 32 into operation.

The registration screen controller 32 executes processing of displaying a print setting registration screen on the display part 3, and updating the print setting registration screen based on operation by a user. The print setting registration screen is about a print setting settable at the printer driver 40 to be installed. Thus, if the installer 30 is started in the controller 2, the print setting registration screen is displayed on the display part 3.

Figure 3:
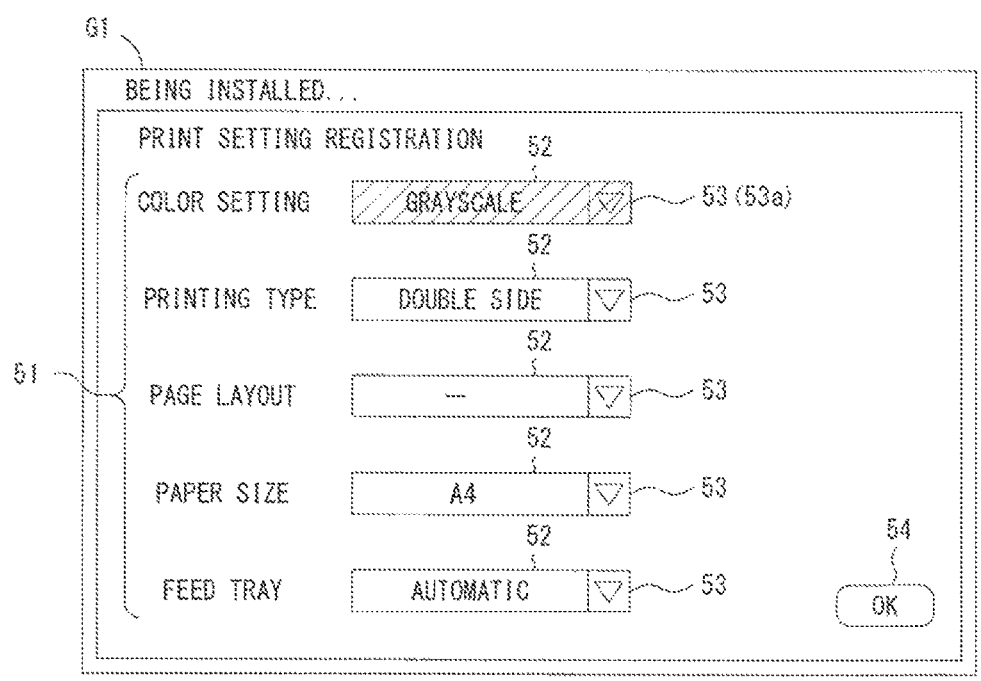
FIG. 3 shows an example of a print setting registration screen.

FIG. 3 shows an example of a print setting registration screen G1. The displayed print setting registration screen G1 contains a plurality of print setting items 51 settable at the printer driver 40 to be installed. Each print setting item 51 contains a set value display field 52 in which a current set value is displayed, and an operation button 53 used for displaying a pull-down menu if a user intends to change a set value displayed in each set value display field 52. The print setting registration screen G1 further contains a button 54 used for registering a print setting including a set value displayed in each set value display field 52 as an installation default print setting.

For display of the print setting registration screen G1 such as the one shown in FIG. 3 on the display part 3, the registration screen controller 32 displays a default value in the factory default print setting 14 acquired by the factory default reader 31 as an initial value in the set value display field 52 of each print setting item 51. Thus, a user is allowed to change the factory default print setting 14 to an intended print setting through operation on the print setting registration screen G1. If the user performs operation for setting change on the print setting item 51, the registration screen controller 32 changes a default value as a factory default, displayed as an initial value about this print setting item 51, to a set value designated by the user based on the operation for setting change, thereby updating the print setting registration screen G1. In this way, the factory default print setting 14 is changed, as needed, to a print setting intended by the user.

The registration screen controller 32 may employ a display style indicating allowance of setting change only for a default value as a factory default displayed in the set value display field 52 of a print setting item 51 determined in advance to be an item changeable by a user. The registration screen controller 32 may employ a display style indicating prohibition of setting change for a default value as a factory default displayed in the set value display field 52 of the other print setting item 51 determined in advance to be an unchangeable item. The illustration of FIG. 3 shows the case where a default value as a factory default displayed in the set value display field 52 about a color setting is displayed in the style indicating prohibition of setting change by a user. Like in this case, if the print setting registration screen G1 contains the set value display field 52 that prohibits setting change by the user, a pull-down menu is not displayed by operation by the user on an operation button 53a corresponding to this set value display field 52 to prohibit change in a set value. This can prohibit a default value about a color setting from being changed accidentally from "GRAYSCALE" to "COLOR" during installation of the printer driver 40, for example, thereby preventing frequent execution of needless color printing before it happens.

If operation for print setting registration by a user is detected, specifically, if the user operates the button 54, the registration screen controller 32 puts the installation default generating part 33 into operation. The installation default generating part 33 is a processor that generates an installation default print setting 37 based on the operation for print setting registration by the user. Specifically, at the time of the operation for print setting registration by the user, the installation default generating part 33 collects set values about the corresponding print setting items 51 in the print setting registration screen G1, and generates a print setting defined by a combination of these set values as the installation default print setting 37. Then, the installation default generating part 33 outputs the generated installation default print setting 37 to the installation controller 36.

The installation controller 36 is a processor that installs the driver program 21 for the printer driver 40 on the storage region 16 in the storage 6. The installation controller 36 reads the program data 13 about the printer driver 40 to be installed from the package program 11. The program data 13 is compressed data of the driver program 21 for the printer driver 40. The installation controller 36 decompresses the compressed program data 13, thereby generating the driver program 21 for the printer driver 40. Then, the installation controller 36 stores the driver program 21 resulting from the decompression into the storage region 16 as a free region in the storage 6 through the operating system 20. In this way, the driver program 21 for the printer driver 40 is installed.

If the CPU 2a becomes ready to execute the driver program 21, the installation controller 36 instructs the operating system 20 to execute the driver program 21, thereby starting the printer driver 40 temporarily in the controller 2. The installation controller 36 includes an output part 36a. After the printer driver 40 is started temporarily, the output part 36a outputs the factory default print setting 14 and the installation default print setting 37 to the printer driver 40.

After being started temporarily at the time of installation of the printer driver 40, the printer driver 40 comes into operation to function as a print setting managing part 41 and a standard setting managing part 42. The print setting managing part 41 stores the factory default print setting 14 and the installation default print setting 37 output from the installer 30 into the storage region 16, and manages the stored print settings. More specifically, the print setting managing part 41 generates a driver management region 22 through the operating system 20. The driver management region 22 is a storage region under management of the printer driver 40. The printer driver 40 manages the driver management region 22 as a storage region not rewritable for a user. Specifically, the driver management region 22 is a first storage region not rewritable for the user. The print setting managing part 41 stores the installation default print setting 37 and the factory default print setting 14 into the driver management region 22 that prohibits rewrite of data therein by the user, and manages the stored print settings. Thus, after installation of the printer driver 40 is finished, the print settings 37 and 14 stored in the driver management region 22 are managed in a manner that prohibits rewrite by the user.

The print setting managing part 41 outputs the installation default print setting 37 to the operating system 20. At this time, the print setting managing part 41 instructs the operating system 20 to store the installation default print setting 37 into an OS management region 23 under management of the operating system 20. This makes the operating system 20 store the installation default print setting 37 output from the print setting managing part 41 into the OS management region 23 such as a registry under management of the operating system 20 itself, and manage the stored print setting. As shown in FIG. 2, the OS management region 23 includes a user region 24 and a common region 25. The user region 24 is a storage region allocated to each user. The common region 25 is a storage region commonly usable by a plurality of users. Each of the user region 24 and the common region 25 is a second storage region rewritable for a user. The operating system 20 stores the installation default print setting 37 into each of the user region 24 and the common region 25, and manages the stored print setting. The installation default print setting 37 stored in each of the user region 24 and the common region 25 may be rewritten thereafter by the user as a different print setting.

The selection screen controller 34 of the installer 30 is a processor that displays a standard setting selection screen on the display part 3. The standard setting selection screen is a screen in which a user is caused to select a print setting in advance to become a standard setting at the printer driver 40 from a plurality of print settings stored in the driver management region 22 and the OS management region 23. For example, the selection screen controller 34 comes into operation after the installation default generating part 33 generates the installation default print setting 37. After the user performs operation for inputting an intended print setting, the selection screen controller 34 displays the standard setting selection screen on the display part 3, and accepts operation for selecting a print setting to become a standard setting at the printer driver 40.

Figure 4A:
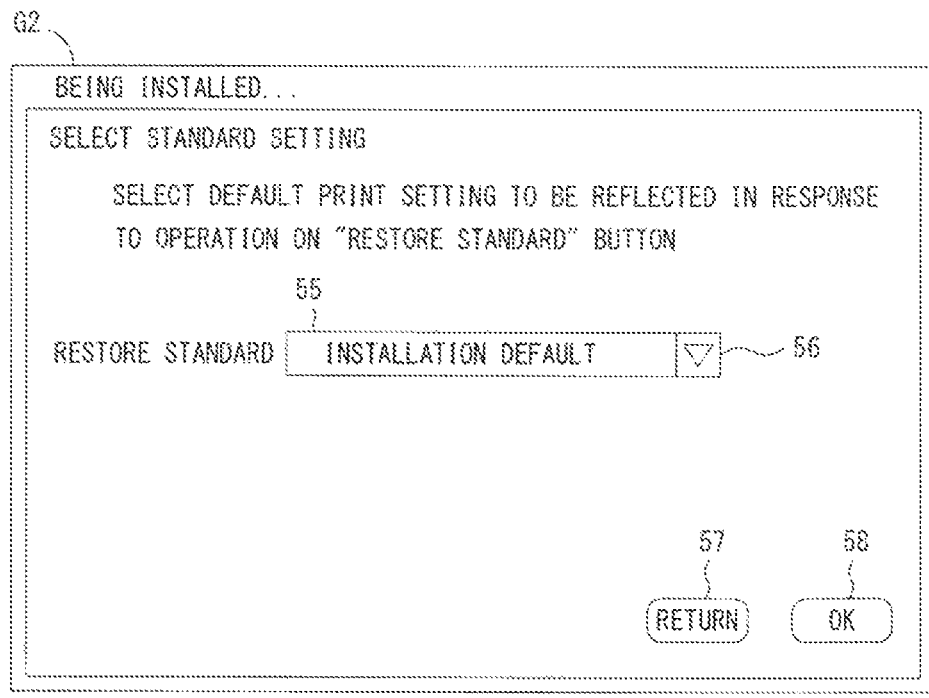
FIGS. 4A and 4B each show an example of a standard setting selection screen displayed at the time of installation of the printer driver.
Figure 4B:
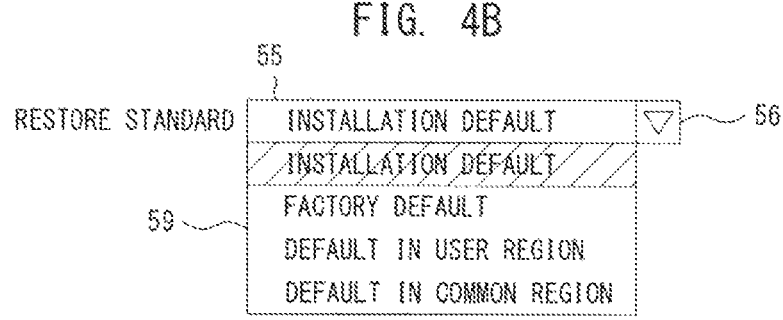

FIGS. 4A and 4B show an example of a standard setting selection screen G2. The standard setting selection screen G2 shown in FIG. 4A is to allow selection of a print setting to be reflected in response to operation by a user on a standard setting button used for restoring a standard setting. The standard setting button is in a print setting screen for the printer driver 40. The standard setting selection screen G2 shown in FIG. 4A includes a standard setting display field 55 in which a print setting to become a standard setting is displayed, and an operation button 56 used for displaying a pull-down menu if the user intends to change a print setting displayed in the standard setting display field 55 to a different print setting. In the illustration of FIG. 4A, the installation default print setting 37 is displayed as a standard setting in the standard setting display field 55. Like in this case, if the installation default print setting 37 is designated as a standard setting, the printer driver 40 handles the installation default print setting 37 stored in the driver management region 22 as a standard setting.

A user intending to change a print setting to become a standard setting clicks the operation button 56. Then, a pull-down menu 59 such as the one shown in FIG. 4B is displayed. The pull-down menu 59 contains the installation default print setting 37 and the factory default print setting 14 stored in the driver management region 22, a print setting stored in the user region 24, and a print setting stored in the common region 25. Thus, the user is allowed to select one from a plurality of print settings displayed in a list form in the pull-down menu 59 as a standard setting for the printer driver 40. In particular, according to this preferred embodiment, operating the standard setting selection screen G2 allows the user to select an intended print setting, input at the time of installation of the printer driver 40, as a standard setting for the printer driver 40.

The standard setting selection screen G2 shown in FIG. 4A contains an OK button 58 and a return button 57 displayed at the bottom of the standard setting selection screen G2. The OK button 58 is used for designating a print setting displayed in the standard setting display field 55 as a standard setting. The return button 57 is used for returning to a previous screen. A user operates the OK button 58 to confirm a print setting displayed in the standard setting display field 55 as a standard setting. This puts the standard setting designating part 35 into operation in the installer 30.

The standard setting designating part 35 generates standard setting information 49 containing a designated standard setting for the printer driver 40. The standard setting information 49 contains one of the installation default print setting 37 and the factory default print setting 14 stored in the driver management region 22, a print setting stored in the user region 24, and a print setting stored in the common region 25 designated as a standard setting. The standard setting designating part 35 outputs the standard setting information 49 to the installation controller 36.

While the printer driver 40 runs temporarily, the installation controller 36 makes the output part 36a output the standard setting information 49 to the printer driver 40 together with output of the factory default print setting 14 and the installation default print setting 37 to the printer driver 40.

The standard setting managing part 42 of the printer driver 40 acquires the standard setting information 49 output from the installer 30, and manages the acquired standard setting information 49. For example, the standard setting managing part 42 stores the standard setting information 49 into either the driver management region 22 or the OS management region 23, and manages the stored information. The standard setting information 49 stored in the driver management region 22 cannot be rewritten thereafter. By contrast, the standard setting information 49 stored in the OS management region 23 can be rewritten thereafter. According to an example described in this preferred embodiment, in consideration of a probability that a user will change a standard setting after installation of the printer driver 40 is finished, the standard setting information 49 is stored into the OS management region 23.

As described above, according to this preferred embodiment, a print setting input by a user at the time of installation of the printer driver 40 is stored as the installation default print setting 37 into the driver management region 22 not rewritable for the user. This allows the printer driver 40 to retain the installation default print setting 37 input for the first time by the user in a manner that prohibits rewrite of the installation default print setting 37. If the printer driver 40 becomes functional to manage the installation default print setting 37 and the standard setting information 49 at the time of installation of the printer driver 40, installation of the printer driver 40 is finished. Thus, the installer 30 finishes running of the printer driver 40 having been started temporarily and then finishes the running state of the installer 30 itself.

Described next is how the printer driver 40 installed on the information processing apparatus 1 by the above-described manner functions while the printer driver 40 runs normally. If a user gives an instruction to make a print to a running application such as a document editing application, for example, the application instructs the operating system 20 to start the printer driver 40. Then, the operating system 20 executes the driver program 21 installed on the storage region 16 to start the printer driver 40 normally in the controller 2.

Figure 5:
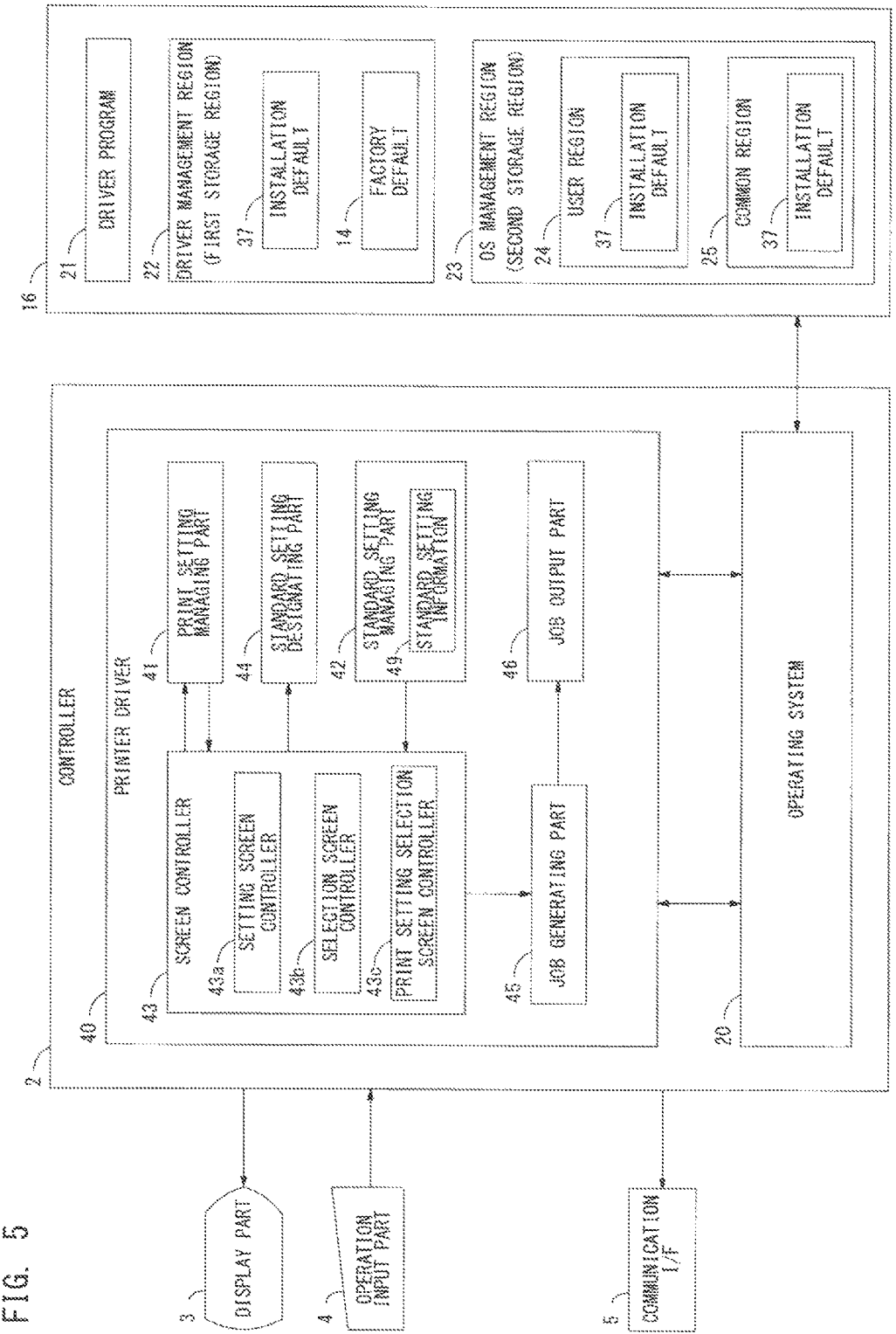
FIG. 5 is a block diagram showing a functional configuration formed if the printer driver is started normally.

FIG. 5 is a block diagram showing a functional configuration formed if the printer driver 40 is started normally. If the printer driver 40 is started normally after being installed on the information processing apparatus 1, the printer driver 40 comes into operation to function as a screen controller 43, a standard setting designating part 44, a job generating part 45, and a job output part 46 in addition to the above-described print setting managing part 41 and standard setting managing part 42.

The screen controller 43 is a processor that controls a display screen to be displayed on the display part 3. The screen controller 43 has the functions of a setting screen controller 43a, a selection screen controller 43b, and a print setting selection screen controller 43c. The setting screen controller 43a is a processor that displays a print setting screen G3 on the display part 3 and accepts operation for making a print setting by a user.

Figure 6:
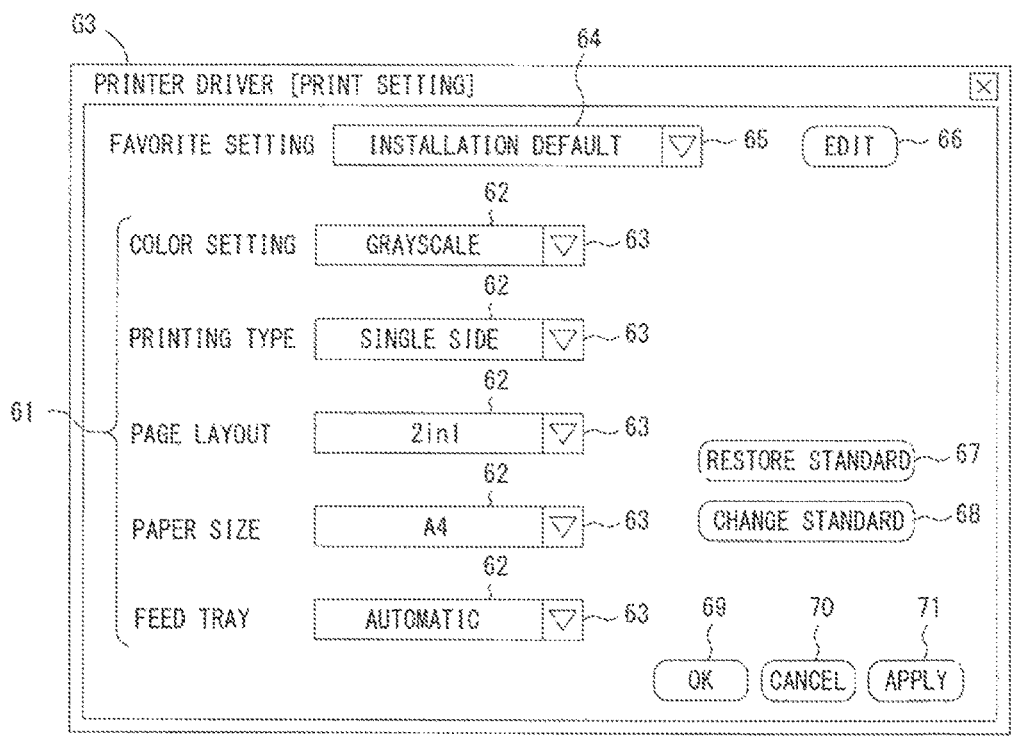
FIG. 6 shows an example of a print setting screen displayed by a setting screen controller.

FIG. 6 shows an example of the print setting screen G3 displayed by the setting screen controller 43a. As shown in FIG. 6, the displayed print setting screen G3 contains a plurality of print setting items 61 settable at the printer driver 40. The print setting items 61 are the same as the print setting items 51 displayed in the print setting registration screen G1 at the time of installation of the printer driver 40. Each print setting item 61 contains a set value display field 62 in which a current set value is displayed, and an operation button 63 used for displaying a pull-down menu if a user intends to change a set value displayed in a corresponding set value display field 62.

To display the print setting screen G3 at the time of start of the printer driver 40, the setting screen controller 43a acquires the standard setting information 49 under management of the standard setting managing part 42. Based on the acquired standard setting information 49, the setting screen controller 43a determines a print setting designated as a standard setting for the printer driver 40. Then, the setting screen controller 43a requests the print setting managing part 41 to output the determined print setting to the setting screen controller 43a. Based on the request from the setting screen controller 43a, the print setting managing part 41 reads the print setting designated as a standard setting for the printer driver 40 from the driver management region 22 or the OS management region 23, and outputs the read print setting to the setting screen controller 43a. Based on the print setting acquired from the print setting managing part 41, the setting screen controller 43a generates an initial screen in which a set value according to the standard setting is displayed in the set value display field 62 of each print setting item 61, and displays the initial screen on the display part 3. At this time, if the installation default print setting 37 is designated as the standard setting, for example, the print setting screen G3 in which the installation default print setting 37 stored in the driver management region 22 is reflected is displayed as the initial screen on the display part 3. Then, a user operates the operation button 63 of each print setting item 61 to display a pull-down menu. In this way, the user becomes capable of changing a set value about each print setting item 61 to an intended set value. Specifically, the setting screen controller 43a rewrites a set value displayed in the set value display field 62 of each print setting item 61 in the print setting screen G3 based on the setting operation by the user, thereby updating the print setting screen G3.

The print setting screen G3 further contains a standard setting button 67 used for restoring a set value displayed in the set value display field 62 of each print setting item 61 to a print setting as a standard setting. The standard setting button 67 is a button used for accepting operation for standard setting reflection by a user. If the user operates the standard setting button 67, the setting screen controller 43a requests the print setting managing part 41 to output a print setting as the standard setting to the setting screen controller 43a based on the standard setting information 49, as the setting screen controller 43a does at the time of start of the printer driver 40. Based on the print setting as the standard setting acquired from the print setting managing part 41, the setting screen controller 43a displays a set value according to the standard setting in the set value display field 62 of each print setting item 61, thereby updating the print setting screen G3. Thus, if the installation default print setting 37 is designated as the standard setting, the user is allowed to restore the print setting screen G3 at any time in which the installation default print setting 37 is reflected by performing the operation for standard setting reflection.

The print setting screen G3 contains a standard change button 68 used for changing a standard setting for the printer driver 40. The standard change button 68 is used for accepting operation for standard setting change by a user. If the standard change button 68 is operated, the selection screen controller 43b comes into operation in the screen controller 43. In response to the operation on the standard change button 68, the selection screen controller 43b displays a standard setting selection screen on the display part 3. The standard setting selection screen is a screen in which the user is caused to select a print setting to become a standard setting at the printer driver 40 from a plurality of print settings stored in the driver management region 22 and the OS management region 23. Then, the selection screen controller 43b accepts operation for changing the print setting to become a standard setting at the printer driver 40.

Figure 7:
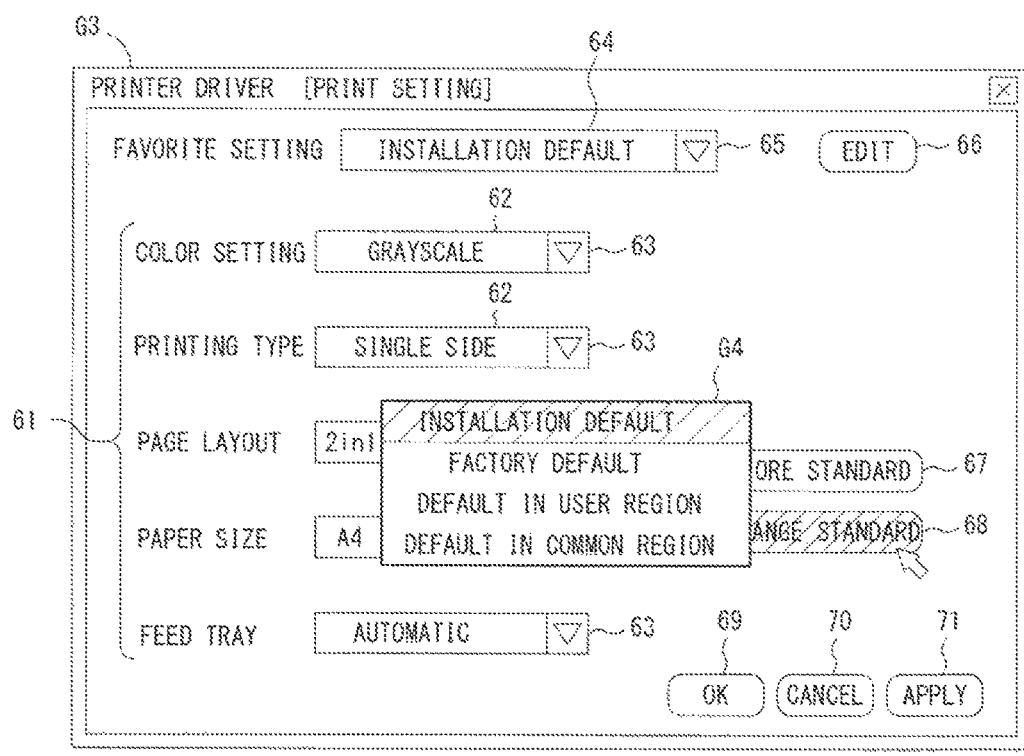
FIG. 7 shows an example of a standard setting selection screen displayed if the printer driver is started normally.

FIG. 7 shows an example of a standard setting selection screen G4. As shown in FIG. 7, based on operation for standard setting change by a user, the selection screen controller 43b displays the standard setting selection screen G4 in a pop-up style in front of the print setting screen G3. The standard setting selection screen G4 allows selection of a print setting to be reflected in response to operation for standard setting reflection by a user on the print setting screen G3 for the printer driver 40. The standard setting selection screen G4 has a pull-down menu style such as the one shown in FIG. 7. The displayed pull-down menu contains the installation default print setting 37 and the factory default print setting 14 stored in the driver management region 22, a print setting stored in the user region 24, and a print setting stored in the common region 25. Thus, the user is allowed to select one from a plurality of print settings displayed in a list form in the standard setting selection screen G4 as a standard setting for the printer driver 40. If the user selects one print setting, the selection screen controller 43b puts the standard setting designating part 44 into operation.

The standard setting designating part 44 functions in the same way as the standard setting designating part 35 that comes into operation in the installer 30 at the time of installation of the printer driver 40. The standard setting designating part 44 generates the standard setting information 49 containing a designated standard setting for the printer driver 40. The standard setting information 49 contains one of the installation default print setting 37 and the factory default print setting 14 stored in the driver management region 22, a print setting stored in the user region 24, and a print setting stored in the common region 25 designated as a standard setting. Specifically, the standard setting designating part 44 generates the standard setting information 49 containing one print setting designated as a standard setting based on selecting operation performed on the standard setting selection screen G4 by a user. The standard setting designating part 44 outputs the generated standard setting information 49 to the standard setting managing part 42. In this way, the standard setting information 49 under management of the standard setting managing part 42 is updated.

Referring back to FIG. 6, the print setting screen G3 contains the following displayed at the top of the print setting screen G3: a favorite setting display field 64 in which a print setting reflected in each print setting item 61 in the print setting screen G3 is displayed; an operation button 65 used for changing a print setting displayed in the favorite setting display field 64 to a different print setting, and displaying a print setting selection screen for calling the different print setting; and an edit button 66 used by a user for editing a print setting to be set as a favorite. If the print setting screen G3 in which a print setting designated as a standard setting is displayed as an initial screen at the time of start of the printer driver 40, for example, the name of the print setting corresponding to the standard setting is displayed in the favorite setting display field 64. In the illustration of FIG. 6, the installation default print setting 37 is displayed in the favorite setting display field 64, and a set value determined based on the installation default print setting 37 is displayed in each print setting item 61.

By operating the operation button 65, a user is allowed to select a print setting to be reflected in the print setting screen G3 from a plurality of print settings stored in the driver management region 22 and the OS management region 23. Specifically, the operation on the operation button 65 by the user is operation for calling a print setting to be reflected in the print setting screen G3.

Figure 8A:
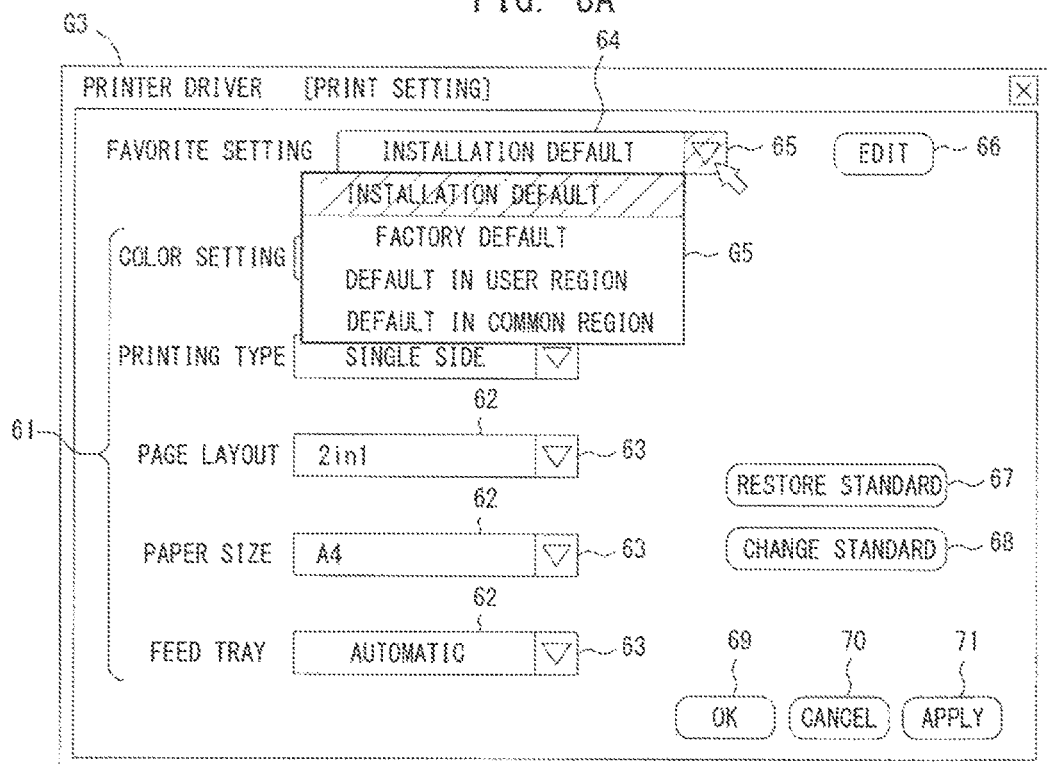
FIGS. 8A and 8B each show a transition between screens made in response to operation for print setting call.
Figure 8B:
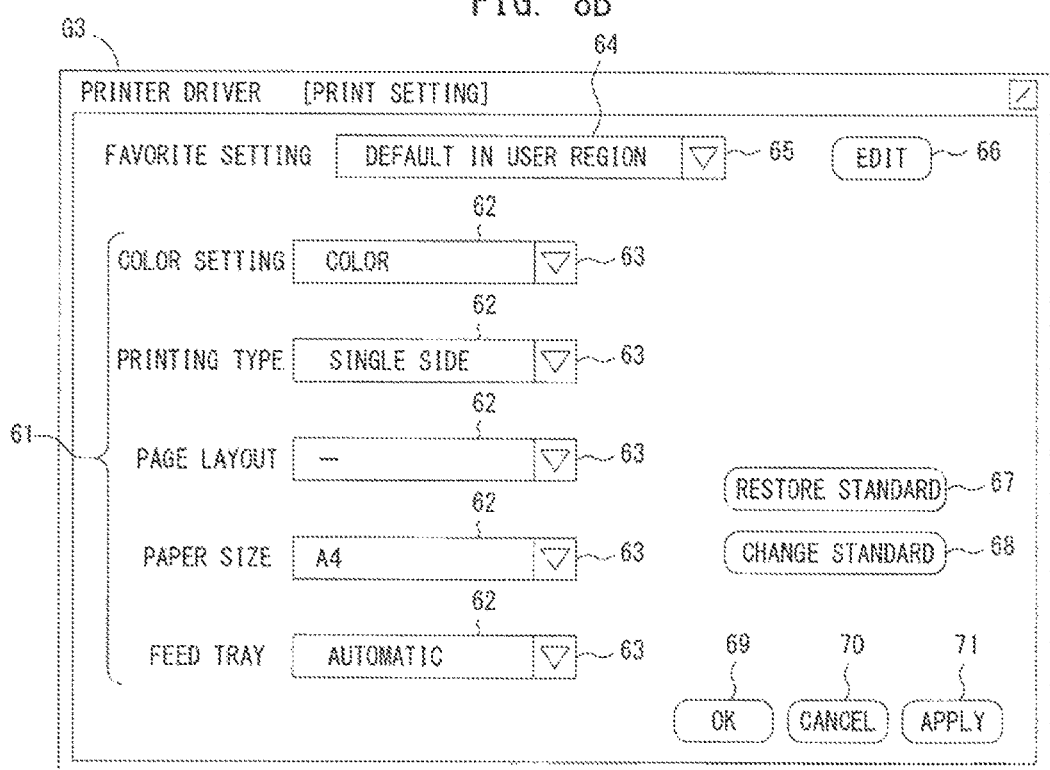

FIGS. 8A and 8B show a transition between screens made in response to operation for print setting call by a user. First, if the user performs the operation for print setting call as shown in FIG. 8A, the print setting selection screen controller 43c comes into operation in the screen controller 43. If the operation for print setting call by the user is detected, the print setting selection screen controller 43c displays a print setting selection screen G5 in which the user is caused to select a print setting to be reflected in the print setting screen G3 from a plurality of print settings stored in each of the driver management region 22 and the OS management region 23. The print setting selection screen G5 is a screen in which a print setting to be reflected directly in the print setting screen G3 for the printer driver 40 is selected. The print setting selection screen G5 has a pull-down menu style such as the one shown in FIG. 8A, for example. The displayed pull-down menu contains the installation default print setting 37 and the factory default print setting 14 stored in the driver management region 22, a print setting stored in the user region 24, and a print setting stored in the common region 25. Thus, by selecting one from a plurality of print settings displayed in a list form in the print setting selection screen G5, the user is allowed to call the selected print setting and reflect this print setting in the print setting screen G3. Specifically, the setting screen controller 43a accepts the above-described selecting operation on the print setting selection screen G5 by the user as operation for print setting reflection, acquires a print setting selected by the user from the print setting managing part 41, and reflects the acquired print setting in each print setting item 61 in the print setting screen G3. As a result, the print setting screen G3 shown in FIG. 8A is changed to a print setting screen G3 such as the one shown in FIG. 8B, for example. The illustration of FIG. 8B shows the case where a print setting stored in the user region 24 in the OS management region 23 is selected.

According to this preferred embodiment, the installation default print setting 37 stored in the driver management region 22 is displayed in the print setting selection screen G5 to be displayed in response to operation for print setting call by a user. Thus, even if the installation default print setting 37 is not designated as a standard setting for the printer driver 40, the user is still allowed to restore the print setting screen G3 at any time in which the installation default print setting 37 is reflected by performing the operation for print setting call.

The print setting screen G3 further contains an OK button 69, a cancel button 70, and an apply button 71 that are displayed at the bottom of the print setting screen G3. The OK button 69 is used for confirming a set value about each print setting item 61 and instructing generation of a print job. The cancel button 70 is used for cancelling operation for changing a print setting. The apply button 71 is used for registering and storing a print setting containing a current set value about each print setting item 61.

If a user operates the apply button 71, the setting screen controller 43a outputs a current set value about each print setting item 61 to the print setting managing part 41. The print setting managing part 41 stores a print setting determined based on the set value output from the setting screen controller 43a into the user region 24 or the common region 25 in the OS management region 23, and manages the stored print setting. If the user performs operation for changing a set value and then operates the apply button 71 while the installation default print setting 37 read from the driver management region 22 is reflected in the print setting screen G3, for example, the print setting managing part 41 generates a new print setting by combining set values about corresponding print setting items 61, stores the new print setting into the user region 24 or the common region 25 in the OS management region 23, and manages the stored print setting. Meanwhile, if the user performs operation for changing a set value and then operates the apply button 71 while a print setting read from the user region 24 or the common region 25 is reflected in the print setting screen G3, for example, the print setting managing part 41 overwrites the print setting originally stored in the user region 24 or the common region 25 with the set value designated by the user, and stores the overwritten print setting. In this way, a print setting stored in the user region 24 or the common region 25 is changed in response to operation on the apply button 71 by the user.

In response to operation on the edit button 66 by a user, the print setting managing part 41 may not overwrite a print setting originally stored in the user region 24 or the common region 25 with a set value designated by the user. In this case, the print setting managing part 41 can generate a new print setting by combining set values about corresponding print setting items 61, store the new print setting into the user region 24 or the common region 25, and manage the stored new print setting.

The job generating part 45 of the printer driver 40 comes into operation in response to operation on the OK button 69 by a user. The job generating part 45 acquires print data such as a document from an application currently running in the controller 2, and generates a print job in which a print setting designated by the user is reflected. Then, the job generating part 45 outputs the print job to the job output part 46. The job output part 46 executes processing of outputting the print job generated by the job generating part 45 to a printing apparatus through the communication interface 5.

Figure 9:
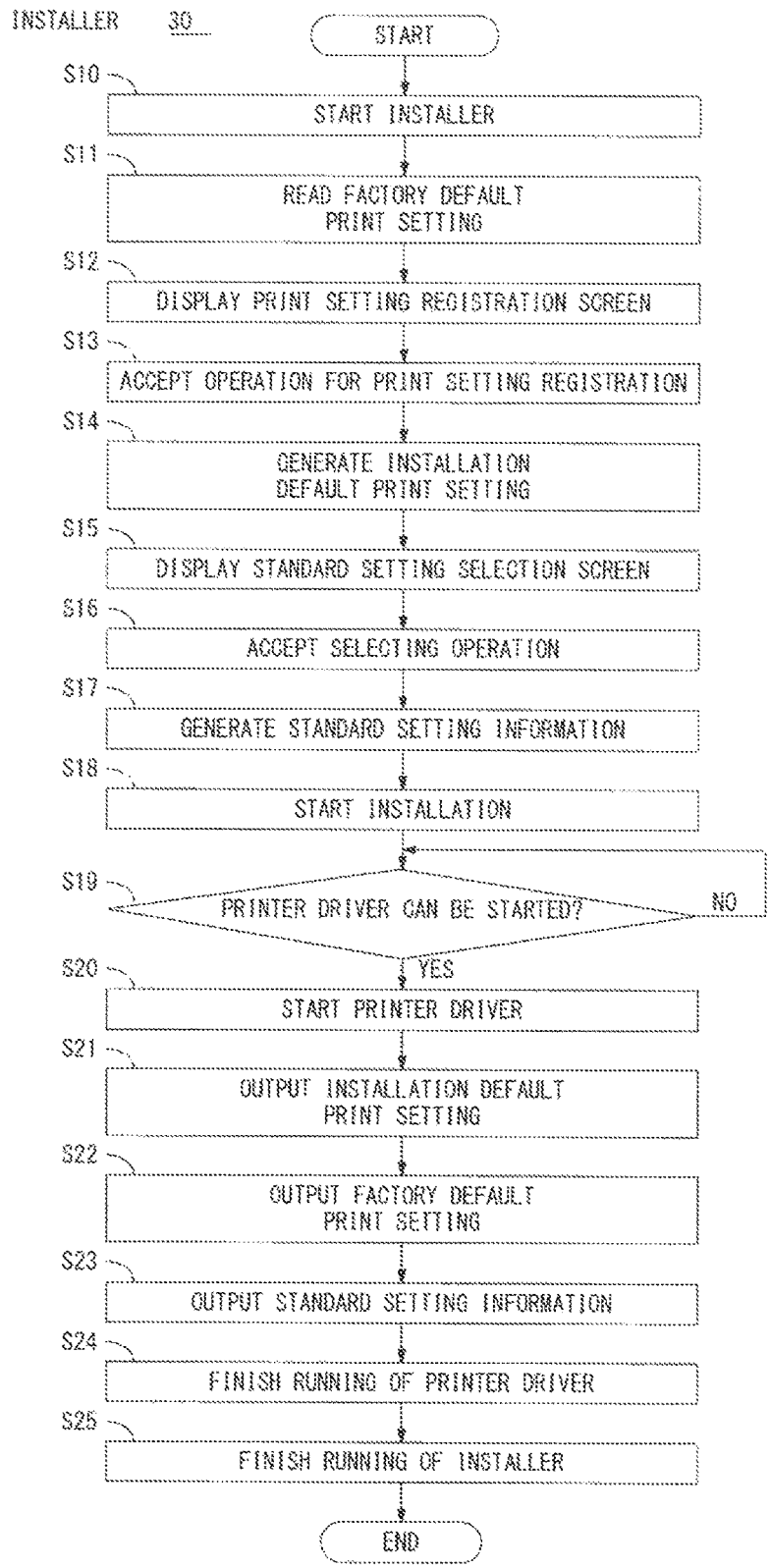
FIG. 9 is a flowchart showing an example of a procedure of processing executed by an installer.

The following describes a procedure of processing executed by the installer 30 during installation of the printer driver 40. FIG. 9 is a flowchart showing an example of the procedure of the processing executed by the installer 30. This processing is executed in response to execution of the installation program 12 in the controller 2 of the information processing apparatus 1.

As shown in FIG. 9, if the installer 30 is started in the controller 2 (step S10), the installer 30 first reads the factory default print setting 14 (step S11), and displays the print setting registration screen G1 on the display part 3 (step S12). Then, the installer 30 accepts operation for print setting registration by a user (step S13), and generates the installation default print setting 37 (step S14). Next, the installer 30 displays the standard setting selection screen G2 on the display part 3 (step S15), and accepts selecting operation by the user (step S16). Then, based on the selecting operation by the user, the installer 30 generates the standard setting information 49 containing one print setting selected from a plurality of print settings and designated as a standard setting (step S17).

Next, the installer 30 starts installation of the printer driver 40 (step S18). As a result, the driver program 21 is installed on the storage region 16 in the storage 6. After starting the installation, the installer 30 continues the installation until the printer driver 40 is brought to a state allowing start of the printer driver 40 (step S19). If the printer driver 40 is in the state allowing start of the printer driver 40 (YES of step S19), the installer 30 starts the printer driver 40 temporarily (step S20). Then, the installer 30 outputs the installation default print setting 37 to the printer driver 40 (step S21), and outputs the factory default print setting 14 to the printer driver 40 (step S22). At this time, the installer 30 instructs the printer driver 40 to store the installation default print setting 37 and the factory default print setting 14 into a storage region not rewritable for the user. In response, the printer driver 40 stores the installation default print setting 37 and the factory default print setting 14 into the driver management region 22, and manages the stored print settings. In this way, the installation default print setting 37 and the factory default print setting 14 are managed in a manner that prohibits rewrite by the user.

The installer 30 outputs the standard setting information 49 to the printer driver 40 (step S23). Then, the printer driver 40 acquires and manages the standard setting information 49. In this way, the printer driver 40 becomes capable of reflecting a print setting designated as a standard setting in the print setting screen G3 at the time of subsequent start of the printer driver 40 or based on operation for standard setting reflection by the user. If the above-described processing is finished, the installer 30 finishes running of the printer driver 40 (step S24), and finishes the running state of the installer 30 itself. Then, the processing is finished completely (step S25).

Figure 10:
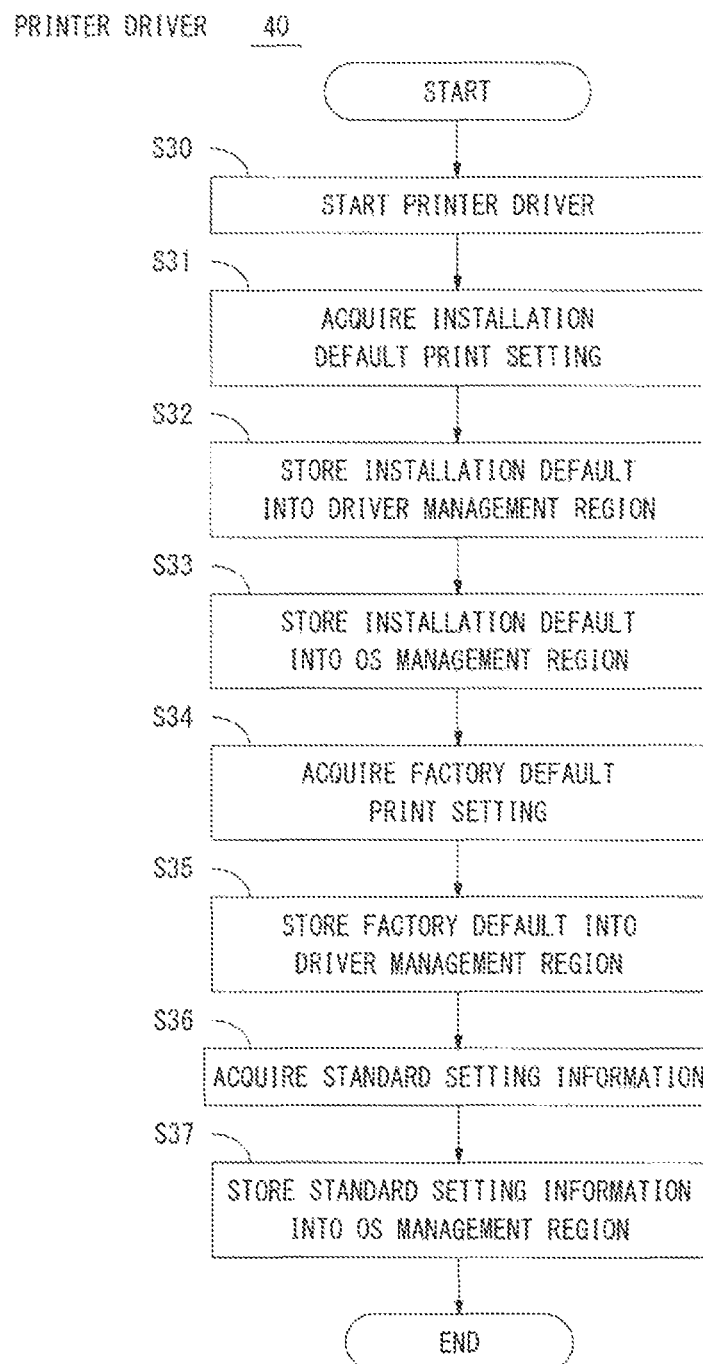
FIG. 10 is a flowchart showing an example of a procedure of processing executed by the printer driver started temporarily at the time of installation of the printer driver.

The following describes a procedure of processing executed by the printer driver 40 started temporarily at the time of installation of the printer driver 40. FIG. 10 is a flowchart showing an example of the procedure of the processing executed by the printer driver 40 started temporarily at the time of installation of the printer driver 40. This processing is executed in response to execution of the driver program 21 in the controller 2 of the information processing apparatus 1.

If the printer driver 40 is started by the installer 30 (step S30), the printer driver 40 acquires the installation default print setting 37 output from the installer 30 (step S31). Then, the printer driver 40 stores the acquired installation default print setting 37 into the driver management region 22 (step S32). After storing the installation default print setting 37 into the driver management region 22, the printer driver 40 stores the installation default print setting 37 in the driver management region 22 further into the user region 24 and the common region 25 in the OS management region 23 (step S33). This allows the user to call the installation default print setting 37 from the user region 24 or the common region 25 and change a print setting.

Next, the printer driver 40 acquires the factory default print setting 14 output from the installer 30 (step S34), and stores the acquired factory default print setting 14 into the driver management region 22 (step S35). Then, the printer driver 40 acquires the standard setting information 49 output from the installer 30 (step S36), and stores the acquired standard setting information 49 into the OS management region 23 (step S37). Then, the processing executed by the printer driver 40 started at the time of installation of the printer driver 40 is finished.

Figure 11:
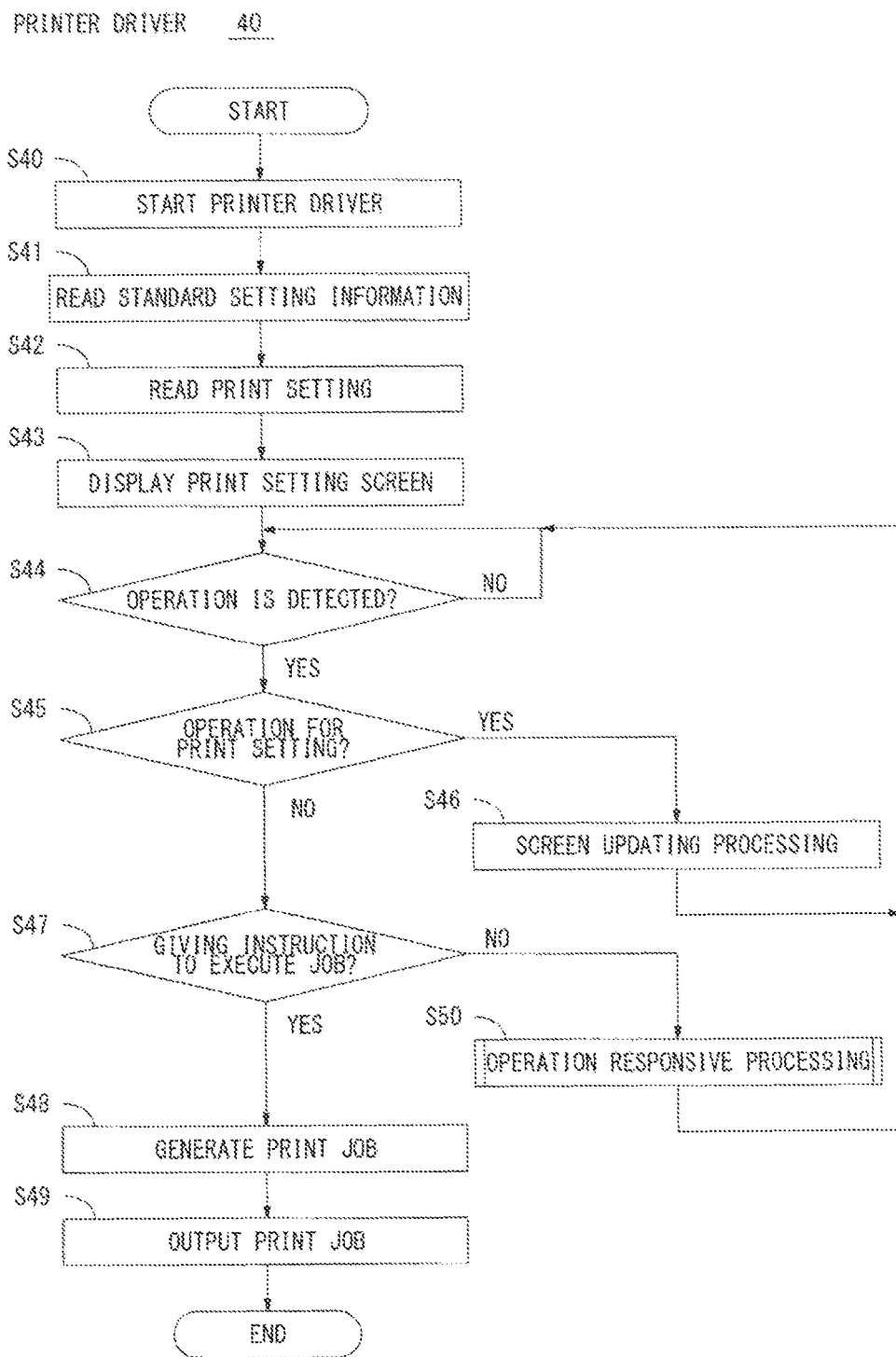
FIG. 11 is a flowchart showing an example of a procedure of processing executed by the printer driver if the printer driver is started normally.

The following describes a procedure of processing executed by the printer driver 40 started normally after installation of the printer driver 40. FIG. 11 is a flowchart showing an example of the procedure of the processing executed by the printer driver 40 if the printer driver 40 is started normally. This processing is also executed in response to execution of the driver program 21 in the controller 2 of the information processing apparatus 1.

If the printer driver 40 is started in response to detection of an instruction given by the user to make a print (step S40), the printer driver 40 first reads the standard setting information 49 (step S41). Then, based on the read standard setting information 49, the printer driver 40 reads a print setting designated as a standard setting for the printer driver 40 (step S42). Next, the printer driver 40 displays the print setting screen G3 on the display part 3 in which the print setting read in step S42 is reflected (step S43).

Then, the printer driver 40 determines whether or not operation by the user is detected (step S44). If operation by the user is detected (YES of step S44), the printer driver 40 determines whether or not this operation by the user is operation for making a print setting (step S45). If the operation by the user is determined to be operation for making a print setting (YES of step S45), the printer driver 40 executes screen updating processing (step S46). This screen updating processing is to update the print setting screen G3 by changing a set value about each print setting item 61 displayed in the print setting screen G3 based on the operation for making a print setting by the user.

If the operation by the user is not operation for making a print setting (NO of step S45), the printer driver 40 determines whether or not the operation by the user is operation for giving an instruction to execute a job (step S47). This determination is YES if the user operates the OK button 69 in the print setting screen G3. If the operation by the user is determined to be operation for giving an instruction to execute a job (YES of step S47), the printer driver 40 generates a print job (step S48), and outputs the generated print job to a printing apparatus (step S49).

If the operation by the user is not operation for giving an instruction to execute a job (NO of step S47), the printer driver 40 executes operation responsive processing (step S50). This operation responsive processing to be executed is responsive to the operation by the user.

Figure 12:
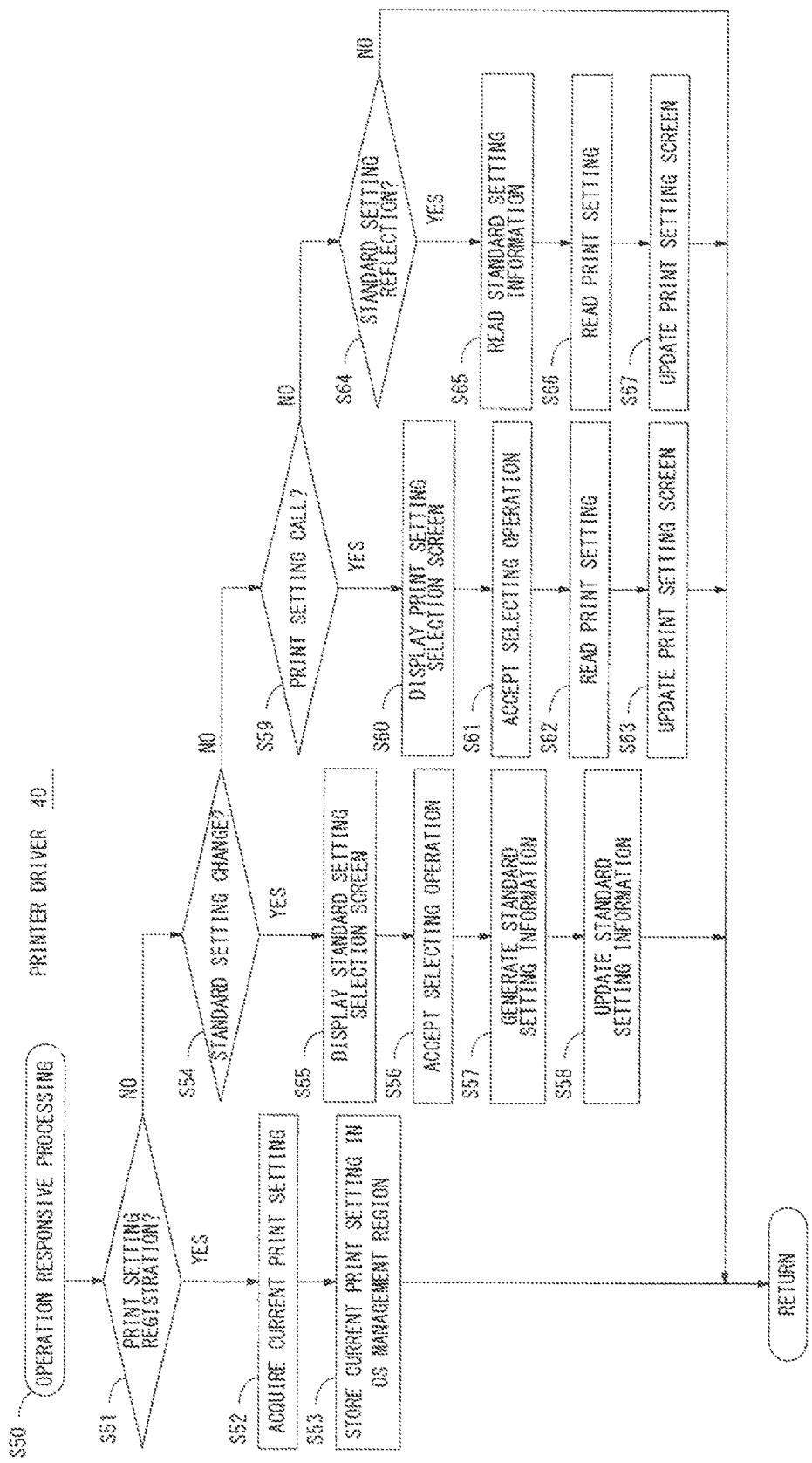
FIG. 12 is a flowchart showing an example of a detailed procedure of operation responsive processing.

FIG. 12 is a flowchart showing an example of a detailed procedure of the operation responsive processing (step S50). After starting this processing, the printer driver 40 determines whether or not the user has performed operation for print setting registration by operating the apply button 71 (step S51). If the operation by the user is operation for print setting registration (YES of step S51), the printer driver 40 acquires a current print setting in the print setting screen G3 (step S52). Then, the printer driver 40 stores the acquired print setting into the user region 24 or the common region 25 in the OS management region 23 (step S53).

If the operation by the user is determined not to be operation for print setting registration (NO of step S51), the printer driver 40 thereafter determines whether or not the operation by the user is operation for standard setting change performed on the standard change button 68 (step S54). If the operation by the user is determined to be operation for standard setting change (YES of step S54), the printer driver 40 displays the standard setting selection screen G4 on the display part 3 (step S55), and accepts selecting operation by the user (step S56). Then, based on the selecting operation by the user, the printer driver 40 generates the standard setting information 49 containing one print setting selected from a plurality of print settings and designated as a standard setting (step S57), and updates the standard setting information 49 (step S58).

If the operation by the user is determined not to be operation for standard setting change (NO of step S54), the printer driver 40 thereafter determines whether or not the operation by the user is operation for print setting call performed on the operation button 65 (step S59). If the operation by the user is determined to be operation for print setting call (YES of step S59), the printer driver 40 displays the print setting selection screen G5 on the display part 3 (step S60), and accepts selecting operation by the user (step S61). Next, the printer driver 40 reads one print setting selected by the user (step S62) and reflects the read print setting in the print setting screen G3, thereby updating the print setting screen G3 (step S63).

If the operation by the user is determined not to be operation for print setting call (NO of step S59), the printer driver 40 thereafter determines whether or not the operation by the user is operation for standard setting reflection performed on the standard setting button 67 (step S64). If the operation by the user is determined to be operation for standard setting reflection (YES of step S64), the printer driver 40 reads the standard setting information 49 (step S65), and reads a print setting as a standard setting designated by the standard setting information 49 (step S66). Then, the printer driver 40 reflects the print setting as the standard setting in the print setting screen G3, thereby updating the print setting screen G3 (step S67). Then, the operation responsive processing is finished.

As described above, if the printer driver 40 is started normally in the information processing apparatus 1, a user is allowed to make an intended print setting by operating the print setting screen G3. In particular, if the user performs operation for registering an intended print setting, this intended print setting is stored into the user region 24 or the common region 25 in the OS management region 23. This prevents rewrite of the installation default print setting 37 stored in the driver management region 22. Thus, the user is allowed to reflect an intended print setting at any time input first at the time of installation of the printer driver 40 through simple operation such as operation for standard setting reflection or operation for print setting call.

According to this preferred embodiment, an intended print setting input by a user at the time of installation of the printer driver is stored into the first storage region (driver management region 22) not rewritable for a user, and managed in the first storage region. This allows the user to restore the print setting at any time through simple operation input for the first time.

Second Preferred Embodiment

Figure 13:
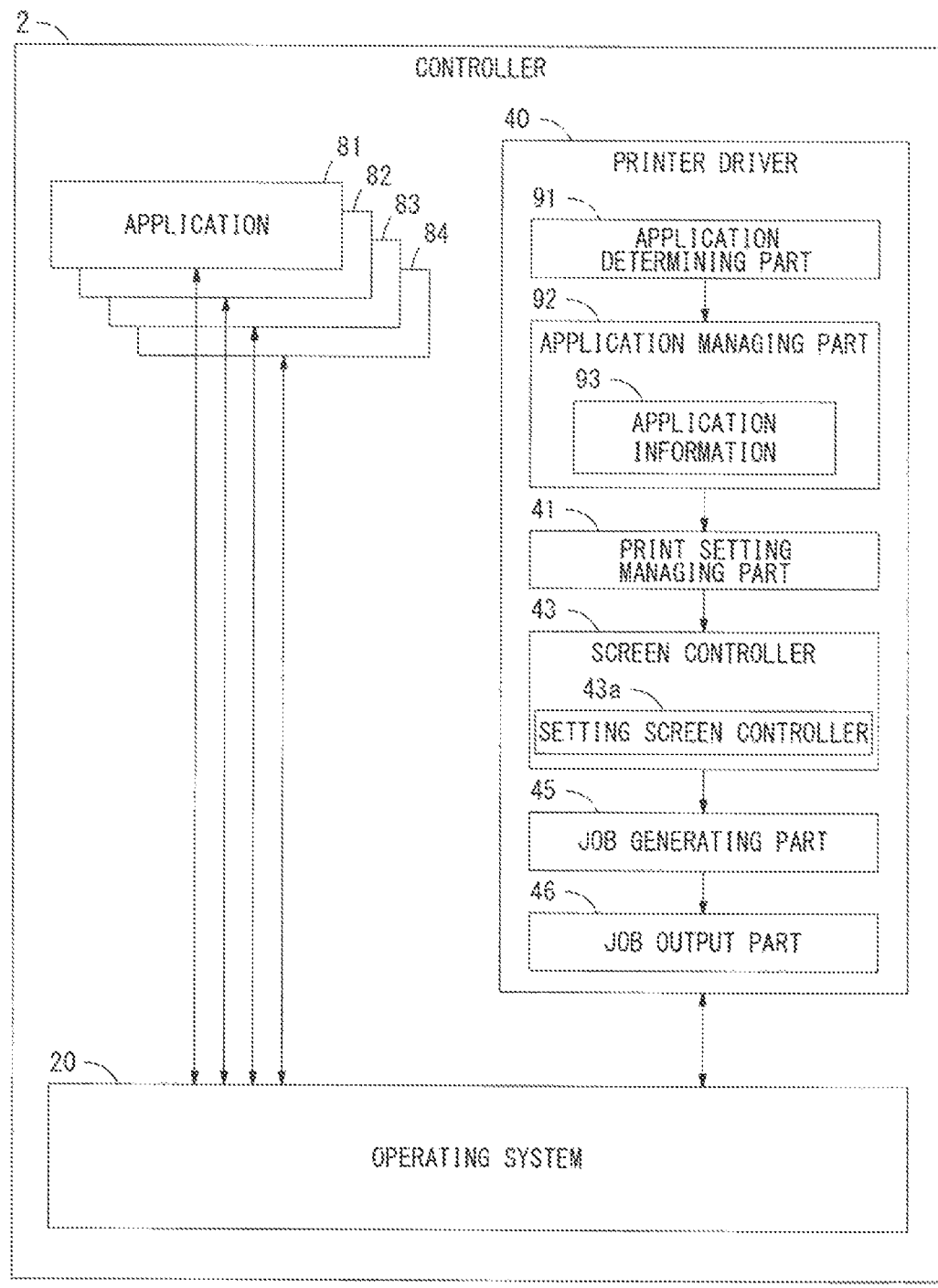
FIG. 13 is a block diagram showing an example of a main functional configuration of a printer driver according to a second preferred embodiment.

A second preferred embodiment of the present invention will be described next. FIG. 13 is a block diagram showing an example of the functional configuration of the printer driver 40 according to the second preferred embodiment. The information processing apparatus 1 contains a plurality of installed applications including an application 81, an application 82, an application 83, and an application 84. The controller 2 is allowed to start these applications 81 to 84 individually. Based on an instruction by a user to make a print, each of the applications 81 to 84 instructs the operating system 20 to start the printer driver 40. In this way, the printer driver 40 can be started normally in the controller 2.

The printer driver 40 according to this preferred embodiment has the functions of an application determining part 91 and an application managing part 92 in addition to the structures described in the first preferred embodiment. The printer driver 40 is configured in such a manner that the printer driver 40 is allowed to read a print setting associated in advance with an application by which the printer driver 40 has been started from the driver management region 22 or the OS management region 23, and reflect the read print setting in the print setting screen G3.

The application determining part 91 is a processor that determines the application 81, 82, 83, or 84 having instructed the operating system 20 to start the printer driver 40. Based on information acquired from the operating system 20, the application determining part 91 determines which one of the applications 81 to 84 has started the printer driver 40. If an application having started the printer driver 40 is determined by the application determining part 91, the application managing part 92 comes into operation.

The application managing part 92 manages application information 93. Based on the application information 93, the application managing part 92 determines a print setting associated in advance with an application having started the printer driver 40.

FIG. 14 shows an example of the application information 93. The application information 93 contains an application 93a and a default setting 93b associated one-to-one with each other. Thus, referring to the application information 93 makes it possible to determine a default print setting associated with one application.

Based on the application information 93, the application managing part 92 determines a print setting associated in advance with an application determined by the application determining part 91 to be an application having started the printer driver 40. The application managing part 92 notifies the print setting managing part 41 of the determined print setting. This allows the print setting managing part 41 to read the print setting associated with the application having started the printer driver 40, and output the read print setting to the setting screen controller 43a of the screen controller 43. As a result, the setting screen controller 43a is allowed to display the print setting screen G3 on the display part 3 as an initial screen for the printer driver 40 in which the print setting associated in advance with the application having started the printer driver 40 is reflected. Thus, according to this preferred embodiment, if the applications 81 to 84 start the printer driver 40 individually, the print setting screen G3 displayed as an initial screen for the printer driver 40 differs among the applications. By registering an intended combination of an application and a print setting in advance with the application information 93, a user is allowed to minimize the frequency of performing operation for making a print setting after start of the printer driver 40. As a result, operability is improved.

A user may register the application information 93 in advance using the function of the installer 30 at the time of installation of the printer driver 40, or may register the application information 93 at the discretion of the user after installation of the printer driver 40.

The setting screen controller 43a may be configured to display a result of determination about a print setting associated with one application made by the application determining part 91, and accept operation for confirming the result by a user. In this case, by detecting the confirming operation by the user, the setting screen controller 43a reflects a print setting associated in advance with an application having started the printer driver 40 in the print setting screen G3, and displays the resultant print setting screen G3. By doing so, the print setting associated in advance with the application having started the printer driver 40 is reflected in the print setting screen G3 on condition that the print setting is confirmed by the user, thereby offering a high degree of convenience to the user.

The configuration and the operation of the installer 30 and those of the printer driver 40 according to this preferred embodiment are the same in other respects as those of the installer 30 and those of the printer driver 40 according to the first preferred embodiment described above.

Third Preferred Embodiment

A third preferred embodiment of the present invention will be described next. According to an example of this preferred embodiment described below, the installer 30 installs a plurality of printer drivers 40 on the storage 6 of the information processing apparatus 1.

Figure 15:
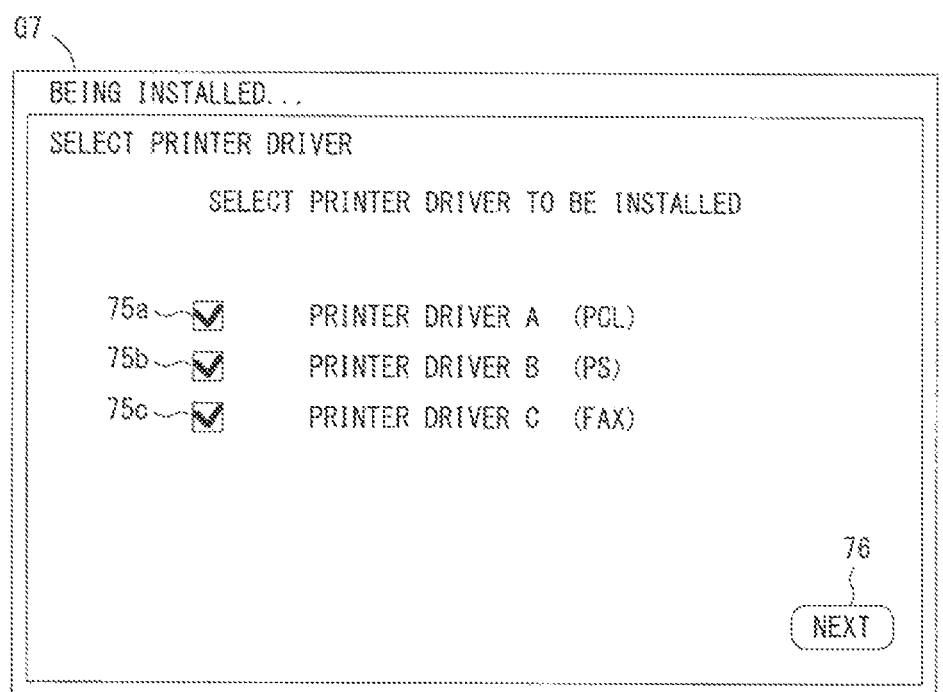
FIG. 15 shows an example of an initial screen displayed if an installer is started.

FIG. 15 shows an example of an initial screen G7 displayed on the display part 3 if the installer 30 is started in this preferred embodiment. The initial screen G7 allows a user to select a printer driver 40 from a plurality of printer drivers 40 that can be installed by the installer 30. Specifically, the user is allowed to select a printer driver 40 to be installed by giving a check mark in a check box 75*a*, a check box 75*b*, or a check box 75*c* displayed on the left side of the name of each printer driver. In the illustration of FIG. 15, the installer 30 is allowed to install three printer drivers 40 and the user has selected all of the three printer drivers 40 to be installed. If the user operates a button 76 displayed at the bottom of the initial screen G7, the installer 30 displays the print setting registration screen G1 described in the first preferred embodiment on the display part 3 for installing all the printer drivers 40 sequentially, one by one, selected by the user.

For installation of the printer drivers 40, the installer 30 executes the processing repeatedly described in the first preferred embodiment on all the printer drivers 40 to be installed. Specifically, the registration screen controller 32 displays the print setting registration screens G1 sequentially about print settings settable at the corresponding printer drivers 40. Based on operations for print setting registration on these print setting registration screens G1 by a user, the installation default generating part 33 generates the installation default print settings 37 about the corresponding printer drivers 40 sequentially. For installation of the printer drivers 40 individually, the installation controller 36 outputs the installation default print setting 37 about each of the printer drivers 40 to this printer driver 40. In this way, each printer driver 40 installed on the storage 6 becomes capable of storing the installation default print setting 37 into the driver management region 22 belonging to the printer driver 40 itself and managing the stored print setting 37. As a result, the installation default print setting 37 about each of the printer drivers 40 is stored into a region not rewritable for the user.

The configuration and the operation of the installer 30 and those of the printer driver 40 according to this preferred embodiment are the same in other respects as those of the installer 30 and those of the printer driver 40 according to the first preferred embodiment described above.

Modifications

The present invention is not to be limited to the substance of the above-described preferred embodiments but various modifications are applicable to the present invention.

For example, according to the above-described preferred embodiments, if the printer driver 40 is brought to a state allowing start of the printer driver 40 during installation of the printer driver 40 by the installer 30, the installer 30 starts the printer driver 40 temporarily and outputs the installation default print setting 37 and the standard setting information 49 to the printer driver 40. However, the installer 30 does not always start the printer driver 40 temporarily during installation of the printer driver 40. For example, the installer 30 may store the installation default print setting 37 and the standard setting information 49 into a storage region to which the printer driver 40 always accesses when the printer driver 40 is started for the first time. In this case, when the printer driver 40 is started for the first time after its installation, the printer driver 40 becomes capable of acquiring the installation default print setting 37 and the standard setting information 49 automatically, and managing the acquired print setting 37 and the acquired standard setting information 49 thereafter.

According to the examples in the above-described preferred embodiments, the factory default print setting 14 is installed on the storage 6 at the time of installation of the printer driver 40. However, the factory default print setting 14 is not always required to be installed on the storage 6.

Although the present invention has been described and illustrated in detail, it is clearly understood that the same is by way of illustrated and example only and is not to be taken by way limitation, the scope of the present invention being interpreted by terms of the appended claims.

What is claimed is:

1. An information processing apparatus comprising a storage, the information processing apparatus starting an installer to install a printer driver on the storage, the installer comprising:
 a registration screen controller displaying a print setting registration screen including one or more settable, default print setting items and receiving input from a user changing at least one of the one or more print setting items;
 an installation default generator generating an installation default print setting based on the change to the at least one print setting item; and
 an output part outputting the installation default print setting to the printer driver when installing the printer driver,
 wherein the printer driver comprises a print setting manager that (i) stores the installation default print setting into a first storage region in the storage and (ii) manages the stored installation default print setting, the first storage region being a region that is not rewritable by the user,
 wherein the printer driver is configured to restore to a print setting screen the one or more print setting items that either include or do not include the change based on a prior selection by the user, and
 wherein the selection is made from among a list of options that includes factory default print settings, installation default print settings, user region print settings, and common region print settings, the factory default print settings being related to the print setting items that do not include the change, and the installation default print settings being related to the print setting items that do include the change.

2. The information processing apparatus according to claim 1, wherein the printer driver further comprises a setting screen controller that (i) displays the print setting screen in which the installation default print setting under management of the print setting manager is reflected, (ii) rewrites the installation default print setting as a print setting intended by the user based on setting operation on the print setting screen by the user, and (iii) reflects the rewritten print setting in the print setting screen, and wherein, based on operation for registration by the user, the print setting manager stores the print setting reflected in the print setting screen into a second storage region in the storage, the second storage region being a region rewritable by the user.

3. The information processing apparatus according to claim 2, wherein, based on operation for standard setting reflection by the user, the setting screen controller reads the installation default print setting from the first storage region, and reflects the read installation default print setting in the print setting screen.

4. The information processing apparatus according to claim 2, wherein the installer further comprises:

a selection screen controller that displays a standard setting selection screen in which the user is caused to select a print setting in advance to be reflected in the print setting screen from the installation default print setting stored in the first storage region and the print setting stored in the second storage region; and a standard setting designator that generates standard setting information containing one of the installation default print setting stored in the first storage region and the print setting stored in the second storage region as a designated print setting based on selecting operation on the standard setting selection screen by the user, wherein the output part outputs the standard setting information to the printer driver at the time of installation of the printer driver, wherein the printer driver further comprises a standard setting manager that manages the standard setting information output from the installer, and wherein, if operation for standard setting reflection by the user is detected, the setting screen controller reads one of the installation default print setting stored in the first storage region and the print setting stored in the second storage region, and reflects the read print setting in the print setting screen based on the standard setting information.

5. The information processing apparatus according to claim 2, wherein the printer driver further comprises:

a selection screen controller that displays a standard setting selection screen in which the user is caused to select a print setting to be reflected in the print setting screen from the installation default print setting stored in the first storage region and the print setting stored in the second storage region;

a standard setting designator that generates standard setting information containing one of the installation default print setting stored in the first storage region and the print setting stored in the second storage region as a designated print setting based on selecting operation on the standard setting selection screen by the user; and a standard setting manager that manages the standard setting information generated by the standard setting designator, and if operation for standard setting reflection by the user is detected, the setting screen controller reads one of the installation default print setting stored in the first storage region and the print setting stored in the second storage region, and reflects the read print setting in the print setting screen based on the standard setting information.

6. The information processing apparatus according to claim 2, wherein the printer driver further comprises a print setting selection screen controller, if operation for print setting call by the user is detected, the print setting selection screen controller displaying a print setting selection screen in which the user is caused to select a print setting to be reflected in the print setting screen from the installation default print setting stored in the first storage region and the print setting stored in the second storage region, and wherein, based on selecting operation on the print setting selection screen by the user, the setting screen controller reads one of the installation default print setting stored in the first storage region and the print setting stored in the second storage region, and reflects the read print setting in the print setting screen.

7. The information processing apparatus according to claim 2, further comprising a plurality of applications to start the printer driver, wherein the printer driver further comprises:

an application manager that manages application information containing association determined in advance between each of the applications and one of the installation default print setting stored in the first storage region and the print setting stored in the second storage region; and an application determinator that determines one of the applications to be an application having started the printer driver, and the setting screen controller determines a print setting associated with the one application determined by the application determinator based on the application information, and, based on a result of the determination, the setting screen controller reads one of the installation default print setting stored in the first storage region and the print setting stored in the second storage region, and reflects the read print setting in the print setting screen.

8. The information processing apparatus according to claim 7, wherein the setting screen controller displays the result of the determination about the print setting associated with the one application determined by the application determinator, and accepts operation for confirming the result by the user.

9. The information processing apparatus according to claim 1, wherein the installer installs a plurality of printer drivers on the storage, wherein the registration screen controller displays the print setting registration screen about a print setting settable at each of the printer drivers, wherein the installation default generator generates the installation default print setting for each of the printer drivers based on operation for print setting registration on the print setting registration screen by the user, and wherein, for installation of each of the printer drivers, the output part outputs the installation default print setting for each of the printer drivers to this printer driver.

10. The information processing apparatus according to claim 1, wherein the installation default generator generates the installation default print setting by accepting operation for print setting registration by the user only on a print setting item belonging to a plurality of print setting items and determined in advance to be a settable print setting item.

11. The information processing apparatus according to claim 1, wherein the registration screen controller displays the print setting registration screen while a factory default print setting is reflected in the print setting registration screen, and wherein, based on operation for print setting registration on the print setting registration screen by the user, the installation default generator rewrites the factory default print setting to generate the installation default print setting.

12. A non-transitory recording medium storing a computer-readable printer driver to be executed by an information processing apparatus comprising a storage, the printer driver causing the information processing apparatus to at least:

receive information indicative of a change, by a user, to at least one settable, default print setting item;

generate an installation default print setting based on the change to the at least one print setting item; and execute a first step of storing an installation default print setting about at least one print setting item, including the at least one print setting item changed by the user, output from an installer during installation of the printer driver into a first storage region, the first storage region being a region in the storage and not rewritable by the user, wherein the printer driver is configured to restore to a print setting screen one or more print setting items that either include or do not include the change based on a prior selection by the user, and wherein the selection is made from among a list of options that includes factory default print settings, installation default print settings, user region print settings, and common region print settings, the factory default print settings being related to the print setting items that do not include the change, and the installation default print settings being related to the print setting items that do include the change.

13. The non-transitory recording medium according to claim 12, wherein the printer driver further causes the information processing apparatus to execute:

a second step of (i) displaying the print setting screen in which the installation default print setting stored in the first storage region is reflected, (ii) rewriting the installation default print setting as a print setting intended by the user based on setting operation on the print setting screen by the user, and (iii) reflecting the rewritten print setting in the print setting screen, and a third step of storing the print setting reflected in the print setting screen into a second storage region based on operation for registration by the user, the second region being a region in the storage and rewritable by a user.

14. The non-transitory recording medium according to claim 13, wherein the printer driver further causes the information processing apparatus to execute a fourth step of reading the installation default print setting from the first storage region, and reflecting the read installation default print setting in the print setting screen based on operation for standard setting reflection by the user.

15. The non-transitory recording medium according to claim 14, wherein the printer driver further causes the information processing apparatus to execute a fifth step of managing standard setting information output from the installer at the time of installation of the printer driver, the standard setting information containing one of the installation default print setting stored in the first storage region and the print setting stored in the second storage region as a designated print setting, and wherein, in the fourth step, if operation for standard setting reflection by the user is detected, one of the installation default print setting stored in the first storage region and the print setting stored in the second storage region is read, and the read print setting is reflected in the print setting screen based on the standard setting information.

16. The non-transitory recording medium according to claim 14, wherein the printer driver further causes the information processing apparatus to execute:

a fifth step of displaying a standard setting selection screen in which the user is caused to select a print setting to be reflected in the print setting screen from the installation default print setting stored in the first storage region and the print setting stored in the second storage region;

a sixth step of generating standard setting information containing one of the installation default print setting stored in the first storage region and the print setting stored in the second storage region as a designated print setting based on selecting operation on the standard setting selection screen by the user; and a seventh step of managing the standard setting information generated by the sixth step, and wherein, in the fourth step, if operation for standard setting reflection by the user is detected, one of the installation default print setting stored in the first storage region and the print setting stored in the second storage region is read, and the read print setting is reflected in the print setting screen based on the standard setting information.

17. The non-transitory recording medium according to claim 14, wherein the printer driver further causes the information processing apparatus to execute:

an eighth step of displaying a print setting selection screen if operation for print setting call by the user is detected, the print setting selection screen being a screen in which the user is caused to select a print setting to be reflected in the print setting screen from the installation default print setting stored in the first storage region and the print setting stored in the second storage region; and a ninth step of reading one of the installation default print setting stored in the first storage region and the print setting stored in the second storage region, and reflecting the read print setting in the print setting screen based on selecting operation on the print setting selection screen by the user.

18. The non-transitory recording medium according to claim 14, wherein the information processing apparatus further comprises a plurality of applications to start the printer driver, and wherein the printer driver further causes the information processing apparatus to execute:

a tenth step of managing application information containing association determined in advance between each of the applications and one of the installation default print setting stored in the first storage region and the print setting stored in the second storage region;

an eleventh step of determining one of the applications to be an application having started the printer driver; and a twelfth step of determining a print setting associated with the one application determined by the eleventh step based on the application information, and, based on a result of the determination, reading one of the installation default print setting stored in the first storage region and the print setting stored in the second storage region, and reflecting the read print setting in the print setting screen.

19. The non-transitory recording medium according to claim 18, wherein in the twelfth step, the result of the determination about the print setting associated with the one application is displayed, and operation for confirming the result by the user is accepted.

20. The information processing apparatus according to claim 1, wherein the selection is made at a standard setting selection screen by the user during the installation of the printer driver.

\* \* \* \* \*